United States Patent [19]
Yang et al.

[11] Patent Number: 5,269,056
[45] Date of Patent: Dec. 14, 1993

[54] LASER WELDING OF WIRE STRANDS TO AN ELECTRODE PIN

[75] Inventors: Robert A. Yang, Denver; David G. Lynch; Dennis L. Sims, both of Aurora, all of Colo.

[73] Assignee: OEA, Inc., Aurora, Colo.

[21] Appl. No.: 945,681

[22] Filed: Sep. 16, 1992

[51] Int. Cl.⁵ .............................................. H01R 43/02
[52] U.S. Cl. ........................................ 29/879; 29/860; 219/121.63
[58] Field of Search ................................ 29/745–748, 29/857, 860, 874, 876–879, 623; 219/121.63, 121.64, 121.76; 339/275; 439/874

[56] References Cited

U.S. PATENT DOCUMENTS

| | | | |
|---|---|---|---|
| 3,665,367 | 5/1972 | Keller et al. | 339/275 T |
| 4,224,499 | 9/1980 | Jones | 219/121 LM |
| 4,714,815 | 12/1987 | Swarts et al. | 219/121 LC |
| 4,729,658 | 12/1988 | Langhans et al. | 219/121.63 |
| 4,746,784 | 5/1988 | Vermij | 29/623 X |
| 4,774,394 | 9/1988 | Lemke | 215/121.6 |
| 4,794,231 | 12/1988 | Banas et al. | 219/121.63 |
| 4,857,697 | 8/1989 | Melville | 219/121.63 |
| 4,914,272 | 4/1990 | Ito et al. | 219/121.63 |
| 4,963,714 | 10/1990 | Adamski et al. | 219/121.63 |
| 4,966,565 | 10/1990 | Dohi | 439/874 |

FOREIGN PATENT DOCUMENTS 2010134  6/1979  United Kingdom ................. 29/878

*Primary Examiner*—Mark Rosenbaum
*Assistant Examiner*—Peter Dungba Vo
*Attorney, Agent, or Firm*—Sheridan Ross & McIntosh

[57] ABSTRACT

Method and apparatus for butt welding a stranded wire to an electrode pin in close proximity to igniter material using laser beams. The wire and electrode pin are preferably part of an initiator assembly used in an airbag system. In a preferred embodiment, the wire is made of copper and the electrode pin is made of a steel alloy. The wire and pin are vertically aligned in contact with each other, without any external force or pressure applied to them. A plurality of beams contact portions of both materials at the same time, causing them to melt, substantially without any melted material extending beyond the width or diameter of the wire.

17 Claims, 3 Drawing Sheets

LASER WELDING OF WIRE STRANDS TO AN ELECTRODE PIN

FIELD OF THE INVENTION

The present invention is directed to welding a variety of gauges of stranded wire to electrode pins and, in particular, to a method and apparatus in which stranded wire made of a first material is welded to an electrode pin made of a second material and where the electrode pin is part of an initiator assembly containing explosive material.

BACKGROUND OF THE INVENTION

It is desired to connect various types of stranded copper wire to the steel electrode pins of an initiator assembly containing combustible material in order to provide a means to conduct electric current to the initiator assembly in order to trigger the assembly. In addition to providing a good electrical connection, the connection must not fail when subjected to a pull test load of about 35 pounds. It is therefore desirable to involve each strand of the wire in the connection in order to more effectively distribute the load. It is also desirable to limit the amount of total heat which is applied to the electrode pins during welding in order to reduce the risk of premature initiation of the combustible material.

The previous method of connecting stranded wire to an electrode pin of the initiator assembly was by arc percussive welding. In this method, the materials to be joined are heated by an arc produced by rapid discharge of electrical energy stored in a capacitor. Force is percussively applied during or immediately after the electrical discharge, forcing the wire and the pin together. A result of percussive arc welding is the formation of an appreciable ball of material in the area of the resulting joint due to displacement of the melted material resulting from the application of force. In addition, the resulting weld area tends to be porous, as a result of the trapping of gas in the welded area.

A drawback of arc percussive welding is that the arc starting point may be inconsistent, with the result that the welds are of inconsistent quality. In addition, inconsistent quality results from limitations in precisely locating the work pieces, as well as controlling the timing and mechanical motion used in imparting the percussive force. These factors tend to make automation of the process difficult.

Lasers have been used as a heat source in several applications. Multiple semiconductor lasers have been used to solder surface mount integrated circuits to printed circuit boards, as in U.S. Pat. No. 4,963,714 to Adamski et al. Laser energy is used to solder a wire to a conductor in U.S. Pat. No. 3,665,367 to Keller et al., and is also used to fuse a crimped conductor to adjacent wire strands in U.S. Pat. No. 4,966,565 to Dohi. Two laser beams are used in the brazing operation disclosed in U.S. Pat. No. 4,714,815 to Swarts et al. Swarts discloses the use of two laser beams focused on a mounting surface on either side of a fine wire. The lasers are used to heat the mounting surface, without directly heating the wire, so that the surface material is melted and wicked up over the wire to form a joint.

Electrolytic tough pitch copper has been successfully welded to high conductivity aluminum using a process similar to the arc percussive welding described above. Instead of an electric arc, a single pulse from a laser beam is directed at the point where the materials are forced into contact by application of pressure in U.S. Pat. No. 4,224,499 to Jones. The brittle intermetallic compounds that are produced as a result of melting the aluminum and copper are forced into a flash region exterior to the joint by the contact pressure. In U.S. Pat. No. 4,774,394 to Lemke a laser aimed down the axis of a wire is used to weld the end of the wire to a metallic fixture.

SUMMARY OF THE INVENTION

In the present invention, stranded copper wire is welded to steel pins of an initiator assembly by application of laser beam energy to the pin and the wire. The welding results in a butt joint between the end of the wire and the end of the pin.

A variety of copper stranded wire may be welded, generally being 18-20 gauge wire having 5-50 strands. Typically, the stranded copper wire is insulated, the conducting portion of the wire varying in diameter from approximately 0.033 to 0.044 inches. The wire may be tinned or untinned. When cut to length prior to welding, the wire is sheared with two blades and the end may not be flat.

Each initiator assembly has two electrode pins, typically made of 52 alloy or 304L stainless steel. The melting temperatures of these materials are similar. Each electrode pin is approximately 0.040 inch in diameter. The initiator assembly may contain combustible materials at the time the wire is joined to the pin, making control over the total heat energy conducted to the assembly important to avoid premature initiation.

Prior to welding, the end of the wire is stripped of insulation and located so that the axis of the wire is substantially coaxial with the axis of the pin. The ends of the wire and the pin are typically brought into contact, although external pressure is not required and a gap of up to approximately 0.005 inch between the ends will not prevent welding.

One of the main objects of the invention is to involve all of the strands of the stranded wire in the weld without requiring excessive input of heat. Accordingly, it is desirable to simultaneously heat as many strands as possible when welding. This is preferably accomplished by aiming three laser beams at the weld area, each having a diameter of approximately 0.030 inch. By spacing the axes of the laser beams approximately 120 degrees apart, the laser energy is applied to the complete circumference of both the wire and the pin. The weld area is therefore heated evenly. While three equally spaced beams are preferred, greater or fewer beams may be used.

A neodymium yttrium aluminum garnet (YAG) laser is used, such as the commercially available Lumonics Model JK701. The output from this device is split into three beams and transmitted by fiberoptics to three focusing lens assemblies. The resulting laser beams each create a spot approximately 0.030 in diameter at the intersection point, approximately 120 mm from the lens. Pulsing of the YAG laser generates high peak power during a pulse. The high peak power results in deep penetration across the butt of the pin and the wire, yielding a good weld with low total heat input.

The amount of energy and the number of pulses of the laser may be easily varied to obtain optimum results with various wire types. It has been found that 3 pulses of 35 joules, each pulse having a duration of 20 msec, produces superior results for 18 gauge wire having 41 strands and 19 gauge wire having 30 strands. For 20 gauge wire having 7 strands, 2 pulses of 35 joules each pulse having a duration of 20 msec produced the best results. When multiple pulses are used, the pulses are separated by an interval of 167 msec. In contrast, for 18 gauge wire having 20 strands, a single 20 msec pulse of 50 joules is used.

The primary requirement for the welded joint is strength in tension, which is measured by pull testing. It has been found that tinned wire appears to yield better results in pull testing, possibly as a result of the solder distributing the load more evenly over the strands. Shielding of the weld area with an inert gas such as argon is not necessary to produce satisfactory welds, and may require higher pulse energy to achieve satisfactory results.

Laser welding has several appreciable advantages over the previous arc percussive welding method. The heat energy introduced into the weld area may be precisely controlled, both in quantity of energy and location of the energy delivery, with the laser as opposed to the conditions resulting from the capacitor discharge in the prior method. Further, the use of multiple beams causes the materials to be evenly heated. Use of the laser also permits parameters to be readily altered to produce optimal conditions for joining a variety of wire types using a single apparatus. The laser welding method does not require the degree of precision in location of the parts or in the timing of mechanically induced percussive force required by the prior method. These factors are particularly advantageous in the context of automated or high volume welding operations.

The resulting weld is also superior. The laser method produces welds without a ball or excess material in the area of the joint. In addition, optical microscopy of the welds reveals that laser welded joints exhibit significantly fewer void areas in the weld region when compared to the arc percussive welded joints.

DETAILED DESCRIPTION OF THE INVENTION

Figure 1:
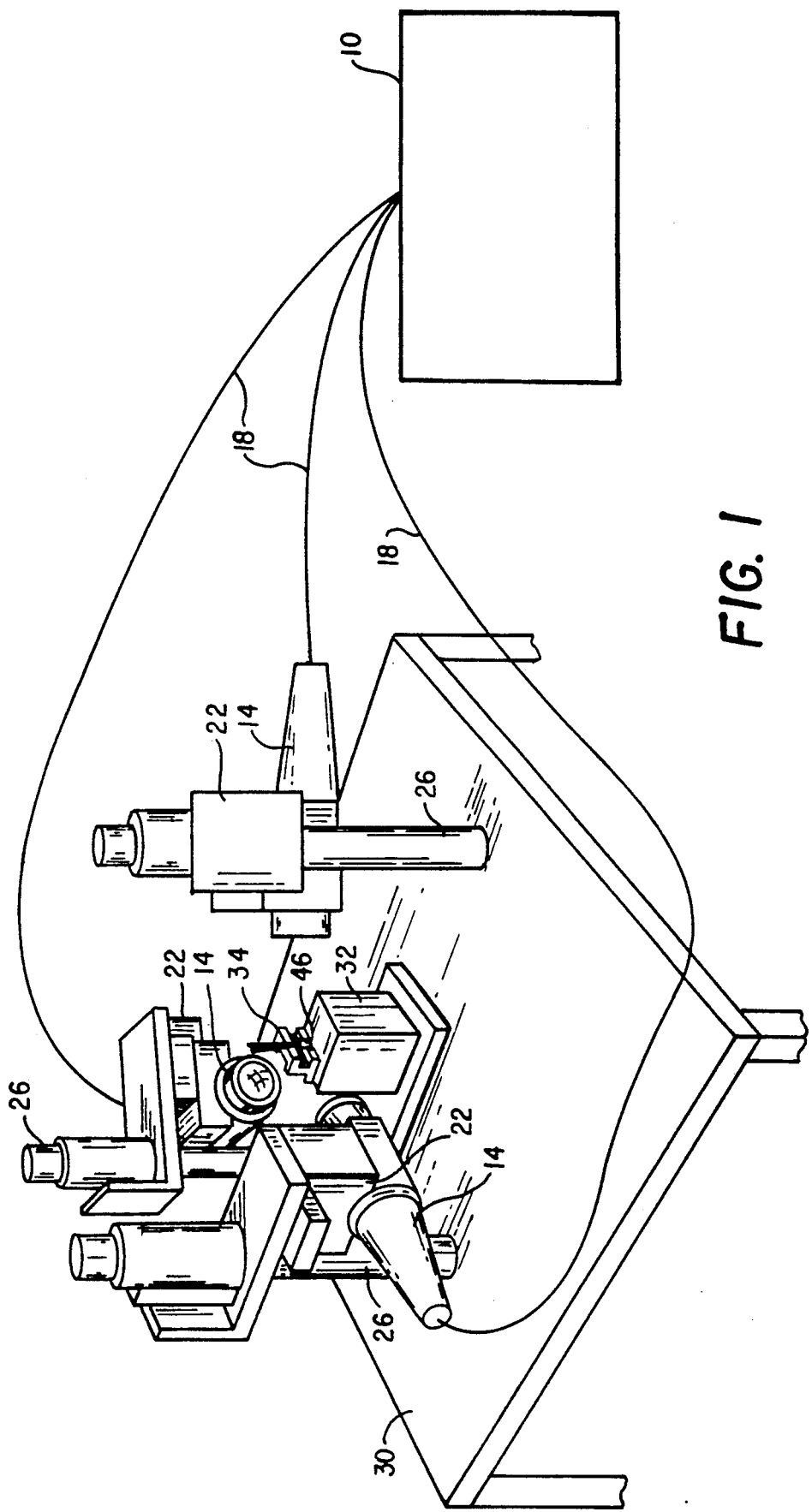
FIG. 1 is a perspective view of a laser welding apparatus constructed according to the teachings of the present invention.

FIG. 1 illustrates a laser generator 10 connected to three lens assemblies 14 by fiberoptic links 18. When the laser generator 10 is activated, the single beam generated is split into three equal parts which are transmitted by fiberoptic links 18 from the laser generator 10 to each lens assembly 14, resulting in a separate laser beam issuing from each lens assembly 14. Each lens assembly 14 is attached to a lens mount 22 which permits the position of the lens assembly 14 to be adjusted. The lens assemblies 14 are positioned substantially equidistant from a central point. Each lens assembly 14 is aimed so that the axis of the laser beam will intersect with the other two beam axes at the central point, each beam axis lying in the same horizontal plane and positioned at an angle of approximately 120 degrees to each other beam axis.

Figure 4:
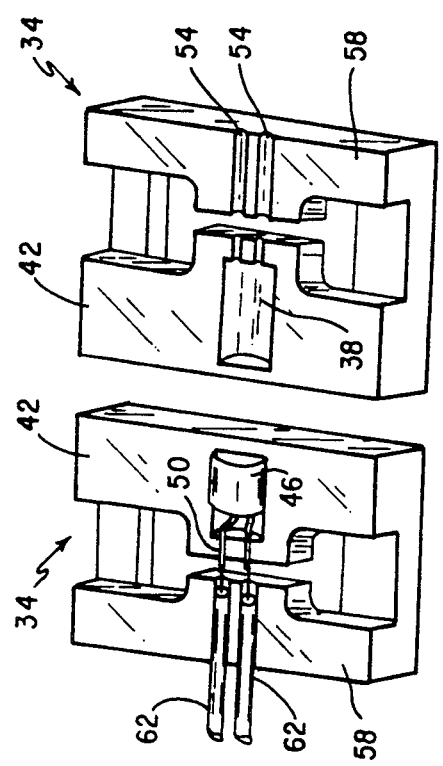
FIG. 4 is a perspective view of a fixture being used to locate wires to be welded to electrode pins.

Each lens mount 22 is attached to a vertical column 26 which is fixed to a horizontal base plate 30. A mounting block 32 fixed to the base plate 30 is located below the central point where the laser beams intersect. A fixture, consisting of two fixture halves 34 divided along a vertical plane, is located on top of the mounting block 32. Referring to FIG. 4, each fixture half 34 contains a recess 38 in the lower part of its mating face 42 to allow an initiator assembly 46 to be located and held securely within the fixture when both fixture halves are assembled. The initiator assembly 46 has a primarily cylindrical body containing combustible material and two steel electrode pins 50 which extend from one end of the body.

Figure 2:
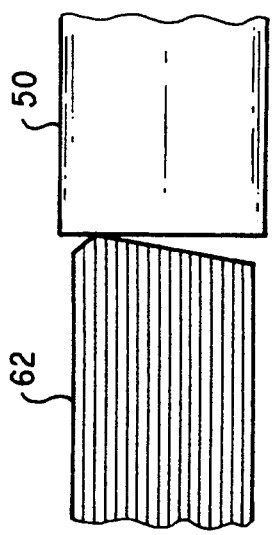
FIG. 2 is a fragmentary view of the end of a stranded wire contacting the end of an electrode pin.

Each fixture half also contains two additional recesses 54 in the upper part of its mating face 58, each of which allows an insulated stranded copper wire 62 to be located with its axis substantially coaxial to the axis of the distal portion of one of the electrode pins 50. While it is preferable for the axes of the wire and the pin to be coincident, successful results have been obtained in circumstances where one axis has been displaced as much as 0.010 of an inch from the other. Referring to FIG. 2, the distal end of the stranded wire 62 is preferably placed in contact with the distal end of the electrode pin 50, although successful results have been obtained with a gap between the wire and pin of up to 0.005 of an inch. When the wire 62 and the pin 50 are in contact, preferably the only force exerted on the wire to maintain contact is gravitational force, as it has been found unnecessary to create additional pressure at the point of contact in order to produce acceptable welds. The stranded wire 62 is stripped of insulation at the end of the wire which is in contact with the electrode pin.

The fixture is loaded by inserting an initiator assembly 46 into the lower recessed area of a fixture half 38 so that the electrode pins 50 extend upward. The fixture is assembled by attaching the remaining fixture half 34, thus securing the initiator assembly 46 in place. Wires 62 are then placed in the holes formed by the upper recesses of the fixture halves 54, with the stripped end of each wire 62 in contact with the top of an electrode pin 50 and the remainder of the wire 62 extending upwardly from the top of the fixture half 34. The assembled fixture is positioned so that the point of contact between a wire 62 and a pin 50 is within the area where the three laser beams 66 will intersect. The portions of each wire 62 and pin 50 adjacent to the point where the pin and wire are in contact are accessible from outside the assembled fixture through slots in the fixture.

Figure 5:
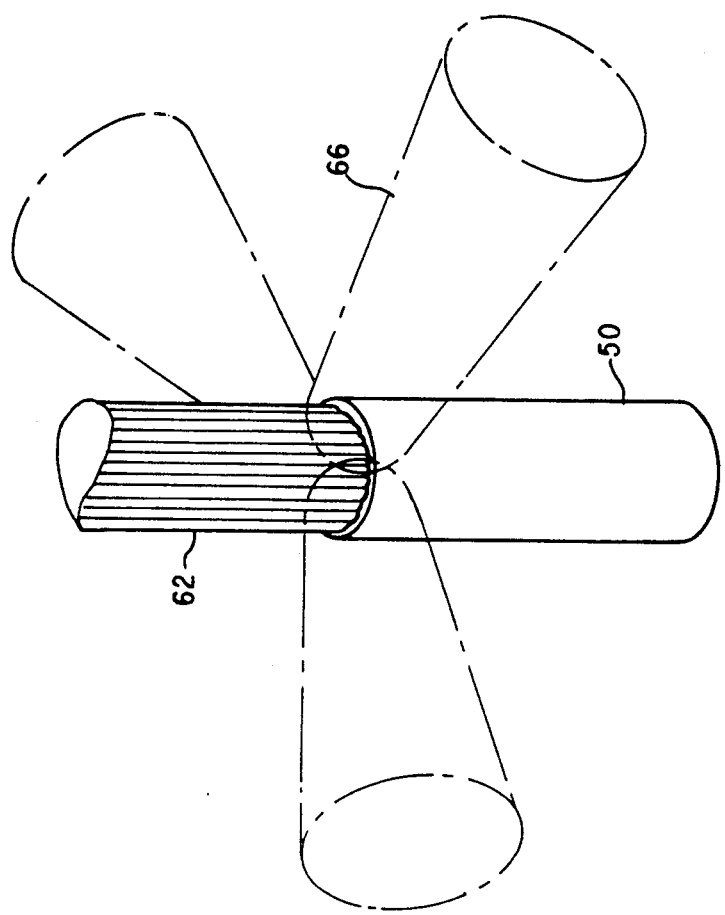
FIG. 5 is a fragmentary perspective view of three laser beams contacting a stranded wire and an electrode pin.

Referring to FIG. 5, when the laser is pulsed, the laser beams 66 pass through the slots in the fixture and contact the ends of the pin 50 and the wire 62 in the area where the ends contact each other. The laser energy initially heats the surfaces of the wire and the pin which the beams directly contact. The majority of the energy contacts the exterior of the pin 50 and the exterior surfaces of the wire strands that are located on the periphery of the bundle of wire strands which make up the wire 62. The use of three equally spaced laser beams 66 permits substantially even heating around the periphery. If the end of the wire 62 and the end of the pin 50 are not perfectly flat and in complete contact with each other, a portion of the energy will heat the areas on the end of the wire or pin which the beams contact. When the electrode pin 50 is composed of 52 alloy, it has been found preferable to adjust the aiming point of the laser beams 66 such that more of the laser energy contacts the electrode pin 50 than the stranded wire 62. Satisfactory results in this case have been obtained when the aiming point is moved up to 0.007 inch below the end of the electrode pin 50.

Figure 3:
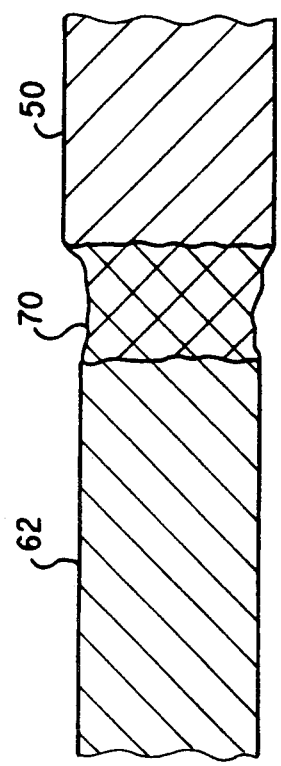
FIG. 3 is a fragmentary section view of a welded connection between stranded wire and an electrode pin made according to the teachings of the present invention.

A portion of the energy imparted to the surfaces directly exposed to the laser beams is conducted through the materials towards the center axis. The conduction of heat through the bundle of wire strands tends to melt all of the strands as well as the entire cross section of the pin 50. Referring to FIG. 3, when sufficient energy has been absorbed, both the copper wire strands and the pin melt and the two materials intermingle in the heated area, which, when cooled, causes the wire and the pin to be welded together. In comparison to the arc percussive method previously used, the relatively lengthy heating of the bundle of wire strands tends to allow gases to escape from the area being welded, reducing porosity in the welded area 70. Optical micrograph inspection of sections of the resulting weld indicates that the two materials are intermixed across the width of the welded area 70. The resulting welded area 70 tends to be substantially free from voids resulting from trapped gas. In addition, the welded area 70 tends to exhibit varying cross-sections, the majority of which are less in area than the area of a cross-section of the bundle of wire strands.

After the first wire 62 is welded to the first pin 50, the fixture is relocated on the mounting block 32 to position the point of contact between the second wire 62 and the second pin 50 within the area where the three laser beams 66 will intersect. The laser is pulsed again, causing the second wire 62 to be welded to the second pin 50. The completed assembly is then removed from the fixture after separation of the fixture halves 34.

What is claimed is:

1. An assembly in which multi-strand conducting wire is welded to an end of an electrode pin, comprising:
   at least a first laser for providing a first laser energy beam;
   means for outputting said first laser energy beam;
   means for supporting said means for outputting;
   a first conducting wire and a second conducting wire, with each being made of a first material, said first and second conducting wires each having multiple strands and a first end to be welded;
   a device having a first electrode pin and a second electrode pin, each of said first and second electrode pins having a free end and being made of a second material different from said first material; and
   fixture means for locating said first conducting wire first end adjacent to said free end of said first electrode pin and for locating said second conducting wire first end adjacent to said free end of said second electrode pin, said fixture means including first means that receives each of said first and second conducting wires and maintains uninsulated portions of said first and second conducting wires spaced from each other and including second means that receives each of said first and second electrode pins, said first and second means being substantially aligned such that uninsulated portions of each of said first and second conducting wires are substantially aligned with said free ends of said first and second electrode pins, respectively, said first and second means being substantially continuously fixed in position relative to each other wherein said first means and said second means do not move relative to each other in providing said substantial alignment, with each of said first and second conducting wires having a force exerted thereon substantially no greater than a gravitational force, wherein said first laser energy beam is directed towards said first conducting wire and said first electrode pin causing each of said first material and said second material to be melted whereby said first electrode pin is welded to said first conducting wire.

2. An assembly, as claimed in claim 1, wherein:
   at least some of said strands of said first conducting wire first end contact said free end of said first electrode pin before said first laser energy beam is directed toward said first conducting wire and said first electrode pin.

3. An assembly, as claimed in claim 1, wherein:
   a majority of said melted materials remain within a fusion zone defined by a diameter of said first conducting wire.

4. An assembly, as claimed in claim 1, wherein:
   a second laser energy beam is applied to both of said first and second materials at substantially the same time as said first laser energy beam.

5. An assembly, as claimed in claim 4, wherein:
   each of said first and second laser energy beams is directed substantially perpendicular to a length of said first electrode pin.

6. An assembly, as claimed in claim 5, wherein:
   each of said first and second laser energy beams contacts a different circumferential section of portions of both said first material and said second material.

7. An assembly, as claimed in claim 6, wherein:
   a third laser energy beam contacts a circumferential section of portions of said first and second materials with said circumferential section being contacted by said third laser energy beam being different from each of said circumferential sections being contacted by said first and second laser energy beams.

8. An assembly in which multi-strand conducting wire is welded to an end of an electrode pin, comprising:
   laser means for providing at least a first laser energy beam;
   means for outputting said first laser energy beam;
   means for supporting said means for outputting;
   first and second conducting wires each including copper, each of said first and second conducting wires having multiple strands and a first end to be welded;
   a device having first and second electrode pins, each of said first and second electrode pins having a free end and including steel having a different melting temperature than said copper; and
   fixture means for locating each of said first and second conducting wire first ends adjacent to said free ends of said first and second electrode pins, respectively, wherein said first laser energy beam is directed toward said first conducting wire and said first electrode pin, with said first laser energy beam contacting more area of said first electrode pin having said steel than said first conducting wire having said copper in simultaneously melting each of said first electrode pin free end and said first conducting wire first end, with an aiming point of said first laser energy beam being no greater than about 0.007 inch below said free end of said first electrode pin and said melting creating a weld between said first electrode pin and said first conducting wire.

9. An assembly in which multi-strand conducting wire is welded to an end of an electrode pin, comprising:

laser means for providing a first laser energy beam;
means for outputting said first laser energy beam;
means for supporting said means for outputting;
a first conducting wire and a second conducting wire each being made of a first material, each of said first and second conducting wires having multiple strands and a first end to be welded;
a device having a first electrode pin and a second electrode pin, each of said first and second electrode pins having a free end and being made of a second material different from said first material; and
fixture means for locating said first conducting wire first end adjacent to said free end of said first electrode pin and for locating said second conducting wire first end adjacent to said free end of said second electrode pin, said first end of said first conducting wire being no greater than about 0.005 inch from said free end of said first electrode pin when said first laser energy beam is directed towards said first conducting wire and said first electrode pin, with each of said first and second materials being melted to provide a weld between said first electrode pin and said first conducting wire.

10. A method for laser welding multi-strand conducting wire to a free end of an electrode pin, comprising:

providing first and second conducting wires including first ends, with each of said first and second conducting wires having multiple strands and being made of a first material;
providing a device having first and second electrode pins including free ends, with each of said first and second electrode pins being made of a second material different from said first material;
locating said first conducting wire first end adjacent to said free end of said first electrode pin;
locating said second conducting wire first end adjacent to said free end of said second electrode pi;
directing a laser energy beam at different areas of said first end of said first conducting wire and said free end of said first electrode pin with said laser energy beam contacting portions of both of said first conducting wire and said free end of said first electrode pin;
melting substantially all of said first end of said first conducting wire and all of said free end of said first electrode pin using said laser energy beam;
creating a weld during said step of melting said first end of said first conducting wire having a weld width defined in a direction substantially parallel to said free end of said first electrode pin, with said weld width being substantially the same throughout an entire juncture between said first conducting wire first end and said first electrode pin free end;
directing a laser energy beam at different areas of said first end of said second conducting wire and said free end of said second electrode pin, with said laser energy beam contacting portions of both of said second conducting wire first end and said second electrode pin free end;
melting substantially all of said first end of said second conducting wire and all of said free end of said second electrode pin using said laser energy beam; and
creating a weld during said step of melting said first end of said second conducting wire having a weld width defined in a direction substantially parallel to said free end of said second electrode pine, with said weld width being substantially the same throughout an entire juncture between said second conducting wire first end and said second electrode pin free end.

11. A method, as claimed in claim 10, wherein:
said step of locating said first conducting wire includes contacting at least some of said strands of said first conducting wire at said first end with said free end of said first electrode pin.

12. A method, as claimed in claim 10, wherein:
said step of locating said first end of said first conducting wire includes positioning at least a majority of said first conducting wire strands at said first end no greater than about 0.005 inch from said free end of said first electrode pin.

13. A method, as claimed in claim 10, wherein:
said step of directing said laser energy beam at different areas of said first conducting wire first end includes having more of said laser energy beam contact said second material than said first material.

14. A method as claimed in claim 13, wherein:
said second material is made substantially of steel and said first material is made substantially of copper.

15. A method, as claimed in claim 10, wherein:
said step of directing includes providing a number of separate pulses of laser energy when welding a first conducting wire having at least 30 strands.

16. A method, as claimed in claim 10, wherein:
said step of directing includes providing a number of separate laser energy beam pulses when welding a first conducting wire having 18 gauge and 41 strands and providing a single laser energy beam pulse when said conducting wire has 20 gauge and 20 strands.

17. A method, as claimed in claim 10, wherein:
said step of creating a weld during said step of melting said first end of said first conducting wire includes maintaining substantially all of said melted materials within a fusion zone defined by a diameter of said first conducting wire.

* * * * *